2,704,744
Patented Mar. 22, 1955

2,704,744

WIRE DRAWING COMPOSITION

Georges Laurent Hugel and Moïse Lerer, Paris, and Robert Joseph Marie Courtel, Saint-Germain-en-Laye, France, assignors to Institut Français du Petrole des Carburants et Lubrifiants, Paris, France No Drawing. Application July 28, 1952,
Serial No. 301,376

Claims priority, application France July 30, 1951

1 Claim. (Cl. 252—28)

A great many lubricants have been recommended for use in wiredrawing. The said lubricants, owing to the heat generated by the friction of the wire in the die-plate through which it is drawn at such high speeds as 600 metres per minute, are heated to temperatures as high as—or even in excess of—600° C. Most of organic compounds—notably such as were recommended for lubricating purposes—are incapable of withstanding such high temperatures and will char. The finished wire looks blackish consequent to the incrustation of charred residues. With a view to remedy these inconveniences which are detrimental to the attractiveness of the product as well as to its properties for certain purposes and even to the possibility of subjecting it to a further wiredrawing process, it has become customary to carry out the final pass dry, in an attempt to at least partially wipe out the carbon deposit. However, such a makeshift has not proved really effective.

The purpose of our invention is to eliminate the aforementioned charred materials by carrying out the last wiredrawing pass, rather than dry, in the presence of substances adapted to clean the wire owing to the combination of several actions each of which contributes to the obtainment of the result aimed at, i. e., a wire the surface of which is blank and free from charred deposits.

The wires according to the invention are perfectly blank, and easily weldable, whereas with usual wires, soiled with char, the weld is badly or not at all carried out.

This feature is particularly interesting for the wires used in reinforced concrete structures, or wire glass structures.

The substance proposed may contain e. g.

1. A solid mineral constituent endowed with polishing or simply lubricating properties. As such, there may be cited alumina, silica, talc, boric acid, clay baked to the desired hardness, etc. The purpose of these mineral ingredients is to contribute to the elimination of the charred residues as a consequence of the rubbing action exerted thereby upon the wire as the same is drawn through the die plate.

The essential property required in order that such a solid mineral constituent can perform the aforesaid functions is that it be so finely dispersed that the carbon particles rubbed off the wire surface will associate with the mineral particles rather than remain adherent to the metal surface. This property is dependent first of all on the size of the particles of the mineral substance.

2. A liquid or low-melting organic constituent capable of dissolving said charred residues or at least to turn them to a colloid. It need not be pointed out that said organic constituent should not be likely to char at high temperatures. Organic constituents which satisfy the two aforesaid conditions are polyethylene-glycols.

3. Contingently, organic substances endowed with lubricating properties in high temperature and pressure conditions generally, substances of this kind which act as extreme-pressure dopes, contain a halogen, sulphur, phosphorus, etc. A further condition to be satisfied by said substances is that they be soluble in the aforementioned liquid or low-melting organic constituent and that their boiling point be so low that no carbon shall be deposited on the wire. As such substances there may be used e. g. p-dichloromethyl-benzene, chloromethyl-naphthalene, p-dimethoxydiphenyl-trichlorethane, glycol dibenzyl xanthogenate, and so on.

An example of a paste for use in the cleaning of iron wire is given hereinafter:

44 parts of talc powder,
54 parts of 800-M. W. polyethylene-glycol,
2 parts of p-dimethoxy-diphenyl-trichlorethane.

The halogen-containing derivative is dissolved in the polyethylene-glycol, whereafter the talc is kneaded thereinto until a perfectly homogeneous paste is obtained.

The following is an example of how our method works.

A soft basic steel wire (T. S.=37–45 kgs./sq. mm.) was wiredrawn through tungsten carbide die-plates down to the following gauges: 1.65, 1.45, 1.25, 1.10, 0.98, 0.87, 0.77 mms. The last pass drawing speed was 250 m. per minute.

Once drawn the wire has been annealed at a temperature of 600 to 700° C. in a cracked ammonia ($N_2+3H_2$) atmosphere.

With the wiredrawing performed with calcium stearate as the lubricant the annealed wire which comes out is black and unsuitable for further wiredrawing through diamond dies.

In a further test the calcium stearate used in the last pass (0.77 mm.) was replaced by polyethylene-glycols of various molecular weights (600, 800, 2000 and 6000). No satisfactory wiredrawing action is possible in such conditions since the wire is scratched as it comes out of the die.

It has furthermore been attempted to use mixtures of various polyethylene-glycols with talc powder. The results were none the better.

It is only when 6% of polyethylene-glycol dibenzylxanthate (M. W.=6000) were added that the wiredrawing process ran satisfactorily; the wire ran out blank without any appreciable damage to the die even after prolonged use.

Thereafter, the wire was annealed just the same as any one which is drawn with the aid of a conventional lubricant. The annealed wire is silver-blank, by which is testified that the lubricant did decompose without leaving carbon deposits.

We claim:

A wire drawing paste composed of 44 parts of talc powder, 54 parts of 800 M. W. polyethylene glycol and 2 parts of p-dimethoxy-diphenyl-trichlorethane.

References Cited in the file of this patent

"Carbowax" Compounds and Polyethylene Glycols, publication of Carbide and Carbon Chemicals Corporation, N. Y., June 30, 1946.